United States Patent
Matsumori et al.

(10) Patent No.: US 9,794,848 B2
(45) Date of Patent: Oct. 17, 2017

(54) METHOD AND SYSTEM FOR PRIORITY-BASED HANDOFF

(75) Inventors: Barry Matsumori, San Diego, CA (US); Laurent Desclos, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 11 days.

(21) Appl. No.: 13/558,308

(22) Filed: Jul. 25, 2012

(65) Prior Publication Data

US 2013/0100928 A1    Apr. 25, 2013

Related U.S. Application Data

(60) Provisional application No. 61/511,120, filed on Jul. 25, 2011.

(51) Int. Cl.
| | |
|---|---|
| *H04W 36/24* | (2009.01) |
| *H04W 36/14* | (2009.01) |
| *H04W 40/06* | (2009.01) |
| *H01Q 3/44* | (2006.01) |
| *H01Q 25/04* | (2006.01) |

(52) U.S. Cl.
CPC ............. *H04W 36/24* (2013.01); *H01Q 3/44* (2013.01); *H01Q 25/04* (2013.01); *H04W 40/06* (2013.01); *H04W 36/14* (2013.01)

(58) Field of Classification Search
CPC ..... H04W 36/24; H04W 36/14; H04W 36/18; H04W 36/0011; H04W 36/08; H04W 80/04; H04W 40/06; H01Q 3/44; H01Q 25/04
USPC ................ 370/331, 338; 455/456.1; 342/368
See application file for complete search history.

(56) References Cited

U.S. PATENT DOCUMENTS

| | | | | |
|---|---|---|---|---|
| 7,602,340 | B2* | 10/2009 | Sato .................. | H01Q 3/44 343/700 MS |
| 7,696,946 | B2* | 4/2010 | Shtrom ................ | H03H 7/383 343/700 MS |
| 8,254,985 | B2* | 8/2012 | Ekicl et al. ............. | 455/550.1 |
| 8,434,128 | B2* | 4/2013 | Kennedy ............... | 726/1 |
| 2003/0048223 | A1* | 3/2003 | Kezys ................. | H01Q 3/26 342/368 |
| 2007/0191013 | A1* | 8/2007 | Gunnarsson et al. ........ | 455/438 |
| 2010/0011078 | A1* | 1/2010 | Shkolnikov et al. ......... | 709/206 |
| 2010/0040217 | A1* | 2/2010 | Aberg et al. ............ | 379/202.01 |
| 2010/0297996 | A1* | 11/2010 | Yokota ................ | 455/436 |

(Continued)

OTHER PUBLICATIONS

Fusion Engineering and Design 56-57 (2001) 975-979.*

*Primary Examiner* — Alpus H Hsu
*Assistant Examiner* — Anthony Luo
(74) *Attorney, Agent, or Firm* — Coastal Patent Law Group, P.C.

(57) ABSTRACT

A system and method are provided for wireless communication to operate with multiple network connections sequentially based on priorities. The system includes a first antenna configured to transmit and receive signals in WLAN and to be a modal antenna having multiple first modes corresponding to multiple first radiation patterns, respectively, a second antenna configured to transmit and receive signals in WWAN, the second antenna having at least one second mode; and a processor coupled to the first antenna and the second antenna. The second antenna may also be a modal antenna having multiple second modes.

52 Claims, 10 Drawing Sheets

(56) References Cited

U.S. PATENT DOCUMENTS

2011/0222523 A1* 9/2011 Fu et al. .................. 370/338
2011/0300879 A1* 12/2011 Braun ..................... 455/456.1
2012/0176929 A1* 7/2012 Choi ........................ 370/253

* cited by examiner

METHOD AND SYSTEM FOR PRIORITY-BASED HANDOFF

CROSS REFERENCE TO RELATED APPLICATIONS

This application claims benefit of priority to U.S. Provisional Application Ser. No. 61/511,120, filed Jul. 25, 2011, and titled "Method and System for Priority-Based Handoff"; the contents of which are hereby incorporated by reference.

BACKGROUND OF THE INVENTION

Field of the Invention

The present invention relates to an antenna system and method for selecting network connections according to priorities.

Description of the Related Art

The term "handoff (or handover)" in wireless communication refers to the process of transferring an ongoing call or data session from a channel associated with a network to another. The wireless networks typically involve Wireless Local Area Network (WLAN) and Wireless Wide Area Network (WWAN), where complimentary characteristics are provided, for example, fast speed, low cost, wide bandwidth and short-range access in the WLAN and slow speed, high cost, narrow bandwidth and long-range access in the WWAN. Laptops, tablets, personal digital assistants, cellular phones, smart phones and other mobile devices may be equipped with a wireless network interface to enable connections to both the WLAN and the WWAN.

Some of the mobile devices may be connected to the WLAN through access points such as routers, and may be adapted to operate in accordance with the IEEE 802.11 standards for communication in the 2.4, 3.6 and 5 GHz frequency bands. WLANs have become popular in recent years for the home or office use due to ease of installation and low cost or often free access. WWANs may be cellular telecommunication networks having multiple base stations, based on cellular network technologies such as Global Systems for Mobile Communication (GSM), General Packet Radio Service (GPRS), Code Division Multiple Access (CDMA), CDMA2000, Universal Mobile Telecommunication System (UMTS), and Enhanced Data Rates for GSM Evolution (EDGE). These cellular network technologies are offered regionally, nationwide and even globally by wireless service providers. Several different types of cells are served by base stations, such as femtocells, picocells, microcells and macrocells, providing different types of overage in the cellular network.

Since the WLAN access is generally provided at low cost or often free of charge, a user's preference may be to stay on a WLAN connection as long as possible. A communication scheme to allow for such a network selection preference may be referred to as the "WLAN-first scheme." As new generations of handsets, laptops, tablets and other wireless communication devices become smaller and embedded with more applications, designing new types of antennas and associated air interface functions is becoming important. In particular, new capabilities that can lead to a QOS improvement are expected to be increasingly in high demand, including, for example, handoff schemes based on priorities involving cost, security, emergency and other considerations and user preferences.

SUMMARY OF THE INVENTION

A system and method are provided for wireless communication to operate with multiple network connections sequentially based on priorities. The communication system includes a first antenna configured to transmit and receive signals in the WLAN and to be a modal antenna having multiple first modes corresponding to multiple first radiation patterns, respectively, a second antenna configured to transmit and receive signals in the WWAN, the second antenna having at least one second mode, and a processor coupled to the first antenna and the second antenna. The second antenna in the system may be configured to be a second modal antenna having multiple second modes corresponding to multiple second radiation patterns. Alternatively the system may include a multi-band modal antenna having multiple modes covering both the WWAN and WLAN bands. The processor is configured to identify one or more first connections with the WLAN associated with one or more access points, respectively, and one or more second connections with the WWAN associated with one or more base stations, respectively, which are available in the area where the communication system is located. The processor is configured also to obtain a configuration that satisfies a priority and provides an optimum signal level by selecting a mode and a network connection for the configuration for each time period.

When the priority involves communication with the WLAN, due primarily to cost considerations, the configuration includes a combination of a mode selected from the multiple first modes and a network connection selected from the one or more first connections, to have the network connection to the WLAN with the optimum signal level.

When the priority involves an emergency situation, the configuration includes a combination of a mode selected from a group consisting of the multiple first modes and the at least one second mode and a network connection selected from a group consisting of the one or more first connections and the one or more second connections, to have the network connection to the WWAN or the WLAN with the optimum signal level.

When the priority involves communication with the WWAN, the configuration includes a combination of a mode selected from the at least one second mode and a network connection selected from the one or more second connections, to have the network connection to the WWAN with the optimum signal level.

When the priority involves optimization of cost, due primarily to a cost variation among the available network connections, the configuration includes a combination of a mode selected from a group consisting of the multiple first modes and the at least one second mode and a network connection selected from a group consisting of the one or more first connections and the one or more second connections, to have the network connection to the WWAN or the WLAN with the optimum cost and the optimum signal level.

When the priority involves optimization of security, the configuration includes a combination of a mode selected from a group consisting of the multiple first modes and the at least one second mode and a network connection selected from a group consisting of the one or more first connections and the one or more second connections, to have the network connection to the WWAN or the WLAN with the optimum security level and the optimum signal level.

When the priority involves a context-oriented preference, and the configuration includes a combination of a mode selected from a group consisting of the multiple first modes and the at least one second mode and a network connection selected from a group consisting of the one or more first connections and the one or more second connections, to have the network connection to the WWAN or the WLAN meeting the context-oriented preference with the optimum signal level.

The processor in the system may be configured to perform a first test to identify the one or more first connections and the one or more second connections by sampling one or more channel quality metrics. In addition, the processor may be configured to perform a second test to select the mode and the network connection by sampling one or more channel quality metrics to assess the signal strength and quality. The channel quality metrics include data rate, signal-to-noise ratio, received signal strength indicator, signal-to-interference-plus-noise ratio and throughput.

The processor in the system may be configured to manage priorities based on, for example, information on network properties including costs and security levels, user's inputs and preferences, applications settings and rules, and other conditions.

A method is provided for wireless communication to operate with multiple network connections sequentially based on priorities. The method includes a step of providing a first antenna for transmitting and receiving signals in WLAN, the first antenna being configured to be a modal antenna having multiple first modes corresponding to multiple first radiation patterns, respectively, and a second antenna for transmitting and receiving signals in WWAN, the second antenna having at least one second mode. The second antenna in the system may be configured to be a second modal antenna having multiple second modes corresponding to multiple second radiation patterns. Alternatively, the providing step may provide a multi-band modal antenna having multiple modes covering the WLAN and WWAN bands. The method further includes a step of identifying one or more first connections with the WLAN associated with one or more access points, respectively, and one or more second connections with the WWAN associated with one or more base stations, respectively, which are available in the area where the wireless communication is conducted. The method further includes a step of selecting a mode and a network connection to obtain a configuration that satisfies a priority and provides an optimum signal level during each time period.

When the priority involves communication with the WLAN, the selecting step includes selecting a mode from the multiple first modes and a network connection from the one or more first connections to have the network connection to the WLAN with the optimum signal level.

When the priority involves an emergency, the selecting step includes selecting a mode from a group consisting of the multiple first modes and the at least one second mode and a network connection from a group consisting of the one or more first connections and the one or more second connections to have the network connection to the WWAN or the WLAN with the optimum signal level.

When the priority involves communication with the WWAN, the selecting step includes selecting a mode from the at least one second mode and a network connection from the one or more second connections to have the network connection to the WWAN with the optimum signal level. In case a base station controller (BCS) commands to move out of the original network connection with the WWAN, the method includes a step of performing a vertical handoff to the WLAN, and a step of second selecting a mode from the multiple first modes and a network connection from the one or more first connections.

When the priority involves optimization of cost, due primarily to a cost variation among the available network connections, the selecting step includes selecting a mode from a group consisting of the multiple first modes and the at least one second mode and a network connection from a group consisting of the one or more first connections and the one or more second connections, to have the network connection to the WWAN or the WLAN with the optimum cost and the optimum signal level.

When the priority involves optimization of security, the selecting step includes selecting a from a group consisting of the multiple first modes and the at least one second mode and a network connection from a group consisting of the one or more first connections and the one or more second connections, to have the network connection to the WWAN or the WLAN with the optimum security level and the optimum signal level.

When the priority involves a context-oriented preference, the selecting step includes selecting a mode from a group consisting of the multiple first modes and the at least one second mode and a network connection from a group consisting of the one or more first connections and the one or more second connections, to have the network connection to the WWAN or the WLAN meeting the context-oriented preference with the optimum signal level.

The method may include a step of managing priorities based on, for example, information on network properties including costs, user's inputs and preferences, applications settings and rules, and conditions.

In the method the identifying step may be repeated when the signal strength and quality deteriorate. In addition, the selecting step may be repeated when the signal strength and quality deteriorate.

In the method the identifying step may include first testing by sampling one or more channel quality metrics to assess availability. In addition, the selecting step may include second testing by sampling one or more channel quality metrics to assess the signal strength and quality. The channel quality metrics include data rate, signal-to-noise ratio, received signal strength indicator, signal-to-interference-plus-noise ratio and throughput.

In the method, the first testing may use a threshold for a channel quality metric and acknowledge the availability of the one or more first connections and the one or more second connections if the sampled channel quality metric surpasses the threshold. The first testing may be repeated with a first predetermined interval.

In the method, the second testing may be repeated with a second predetermined interval. Alternatively, the second testing may be initiated when the sampled channel quality metric deteriorates to a first threshold, and the selecting step may be initiated when the sampled channel quality metric further deteriorates to a second threshold.

BRIEF DESCRIPTION OF THE DRAWINGS

The characteristics and advantages of this invention will be more apparent from the following detailed description when read in conjunction with the accompanying drawings, in which.

DETAILED DESCRIPTION

Figure 1:
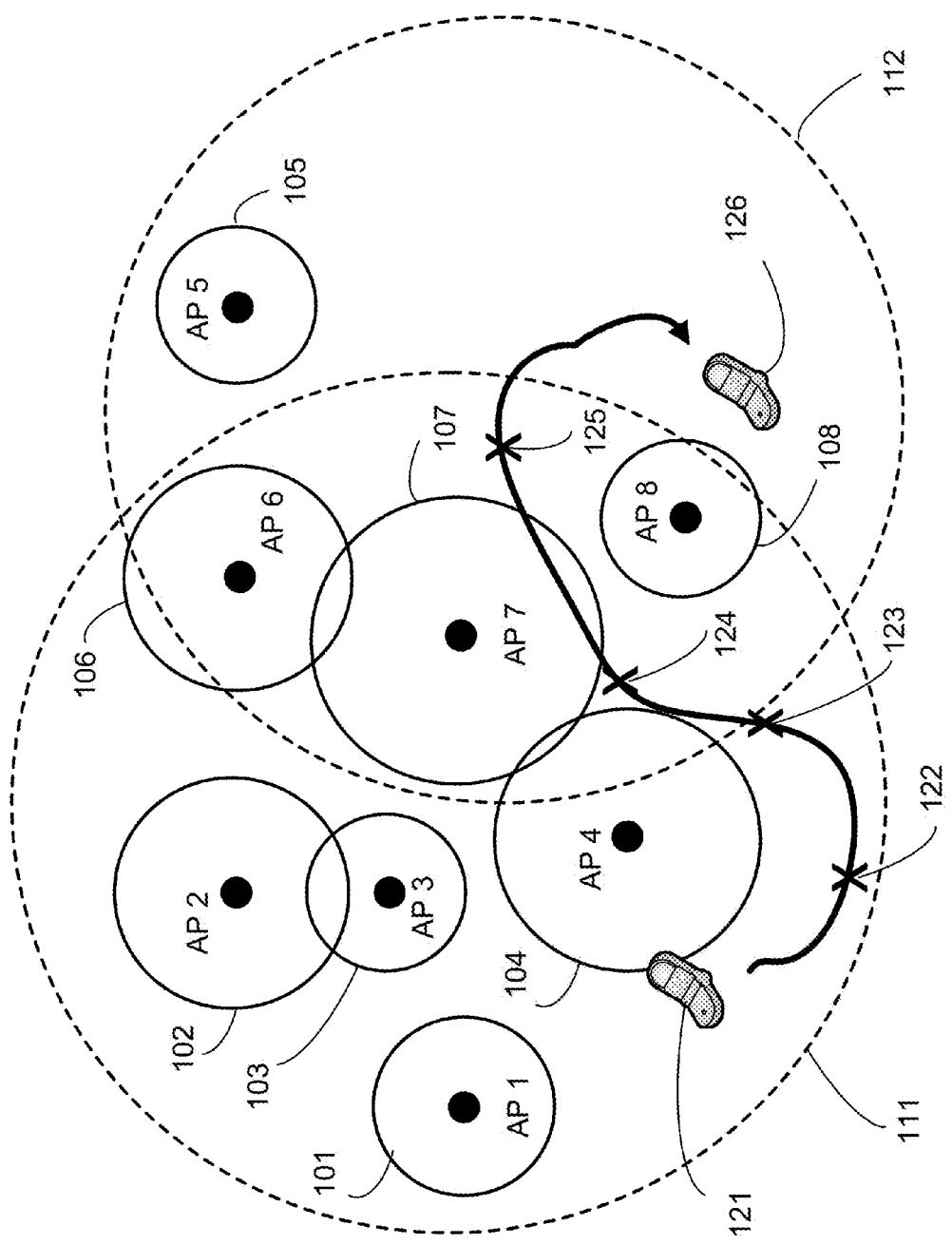
FIG. 1 illustrates an exemplary distribution of overage regions of wireless networks and exemplary locations of a mobile device in use.

FIG. 1 illustrates an exemplary distribution of overage regions of wireless networks and exemplary locations of a mobile device in use. This area may represent a home, an office, a hotel, an airport or other places where both WLAN and WWAN networks are available. In this example, a user is assumed to be in the area where WLAN connections are implemented with eight access points, AP 1, AP 2 . . . and AP 8, having respective overage regions 101, 102 . . . and 108. WWAN connections are also implemented in this area, providing two different overage regions 111 and 112 served by respective base stations. Each coverage region is schematically illustrated by a circle having a certain signal level in terms of strength and quality. The shape and size of a coverage region may vary as the signal fades or amplifies due to interference, absorption, distortion and various other factors caused by diffracting, shadowing or blocking of signal paths by obstacles and/or weather conditions. In some instances, inferences may be caused by the way the user places his head or hand near the handset. Occasionally, one or more of the coverage regions may not be available due to system or device malfunctions in the networks.

In the example of FIG. 1, the user uses a mobile device, such as a laptop, a tablet, a personal digital assistant, a cellular phone or a smart phone, initially at a location 121, where the WLAN signal from the AP 4 having the coverage region 104 is the strongest, and the device may be connected to the WLAN through the AP 4. When the WLAN signal from the AP 4 deteriorates or weakens to a certain level, or when the user moves away from the range of the acceptable signal level to another location 122 where the WLAN signal sufficiently deteriorates, the device may fall over to the WWAN having the coverage region 111 to maintain communication. This type of handoff between the WLAN and the WWAN may be referred to as a "vertical handoff." Thereafter, the user may move through locations 123, 124 and 125 and reach the location 126, while a phone conversation, a data session or an application session is taking place. At the location 124, the WLAN signal from the AP 7 having the coverage region 107 may become strong, and the second vertical handoff may be performed to recover the WLAN connection with the AP 7. However, as the user moves away from the range of the acceptable signal level from the AP 7, the third vertical handoff to the WWAN having the coverage region 111 may be performed near the location 125. Between the locations 125 and 126, the communication has to be redirected from the initial cell to the next cell due to the change in location of the mobile device from the WWAN coverage region 111 to the next WWAN coverage region 112. This type of handoff may be referred to as an "inter-cell handoff" or a "horizontal handoff." Thereafter, the mobile device may detect a strong WLAN signal from the AP 8 having the coverage region 108 and perform the fourth vertical handoff to recover the WLAN connection with the AP 8.

As mentioned earlier, the WLAN access is provided at low cost or often free of charge. Thus, a user's preference may generally be to stay on a WLAN connection as long as possible. In the above example illustrated in FIG. 1, when the WLAN signal from the AP 4 deteriorates while the user is at the location 121 or when the user moves away from the range of the acceptable WLAN signal level from the AP 4 to the location 122, it is desirable to have a mechanism that allows for switching to another access point that may provide an acceptable signal level or recovering the signal level from the original access point AP 4. Furthermore, while the user is moving from the location 121 to the location 126, it is desirable that the WLAN-first scheme be adapted to maintain a reliable WLAN link by identifying an access point that provides the acceptable signal level at each segment along the path, instead of having a handoff to the WWAN.

An antenna system that can be dynamically adjusted may be utilized in a mobile device to stay on a preferred connection during each time period. Such an antenna system may be configured to include a modal antenna that can be actively controlled for different beam steering directions, and can be implemented as a "plug and play" solution to replace a conventional antenna system in a mobile device. A modal antenna, also referred to as a null-steering antenna, can generate multiple modes corresponding to multiple radiation patterns, equivalent to having a set of antennas with the same feed. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011. The contents of the above patent are incorporated herein by reference and are summarized as follows.

Figure 2:
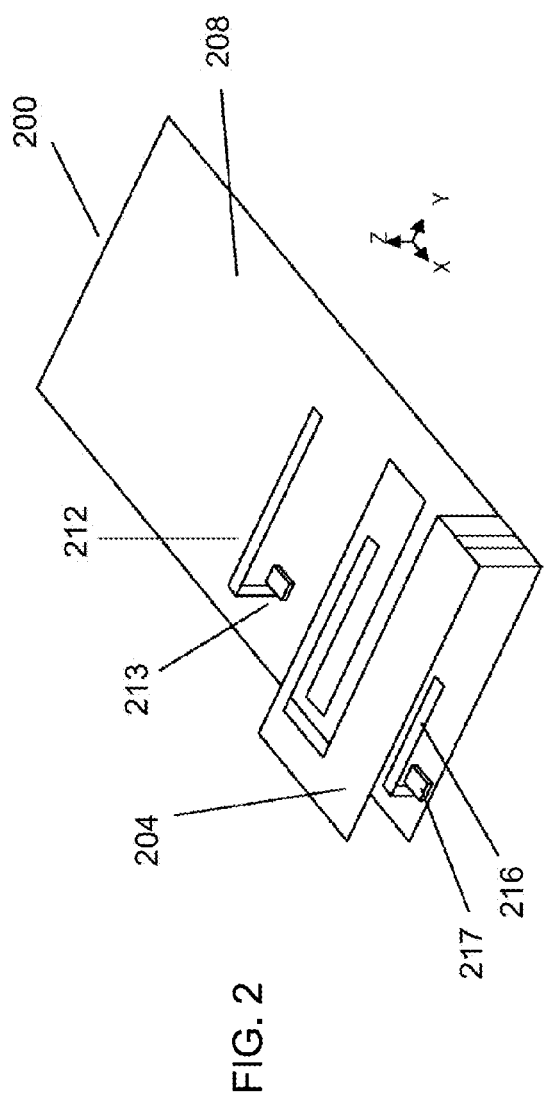
FIG. 2 illustrates an exemplary modal antenna.
Figure 3B:
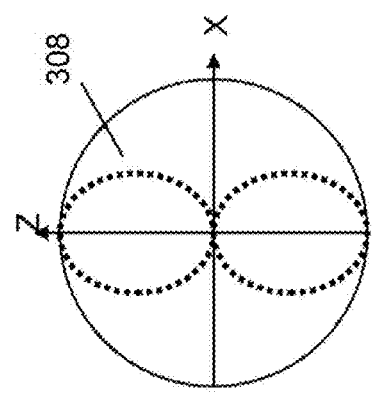
FIG. 3(b) illustrates a radiation pattern associated with the modal antenna in the second state.
Figure 3A:
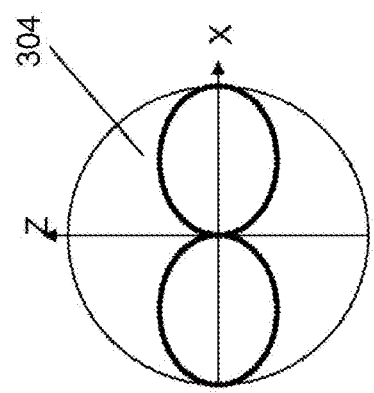
FIG. 3(a) illustrates a radiation pattern associated with the modal antenna in the first state.

FIG. 2 illustrates an exemplary modal antenna 200, which includes an Isolated Magnetic Dipole™ (IMD) element 204 placed on a ground plane 208, a first parasitic element 212 coupled to an first active element 213, and a second parasitic element 216 coupled to a second active element 217. The active elements 213 and 217 may include switches that either electrically connect (short) or disconnect (open) the parasitic elements 212 and 216 to the ground plane 208. This structure allows for two different modes of operation with a common frequency corresponding to a first state where the parasitic elements 212 and 216 are shorted to the ground and a second state where the parasitic elements 212 and 216 are open. FIG. 3(*a*) illustrates a radiation pattern 304 associated with the modal antenna 200 in the first state; and FIG. 3(*b*) illustrates a radiation pattern 308 in the second state, which shows a ninety-degree shift in direction as compared to the radiation pattern 304. Thus, by controlling the active elements 213 and 217 of the modal antenna 200, the operation of two modes can be obtained at the same frequency. The control scheme can be extended for multi-mode operations by incorporating, for example, tunable elements in the active elements for variable control and additional active elements for matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Figure 4:
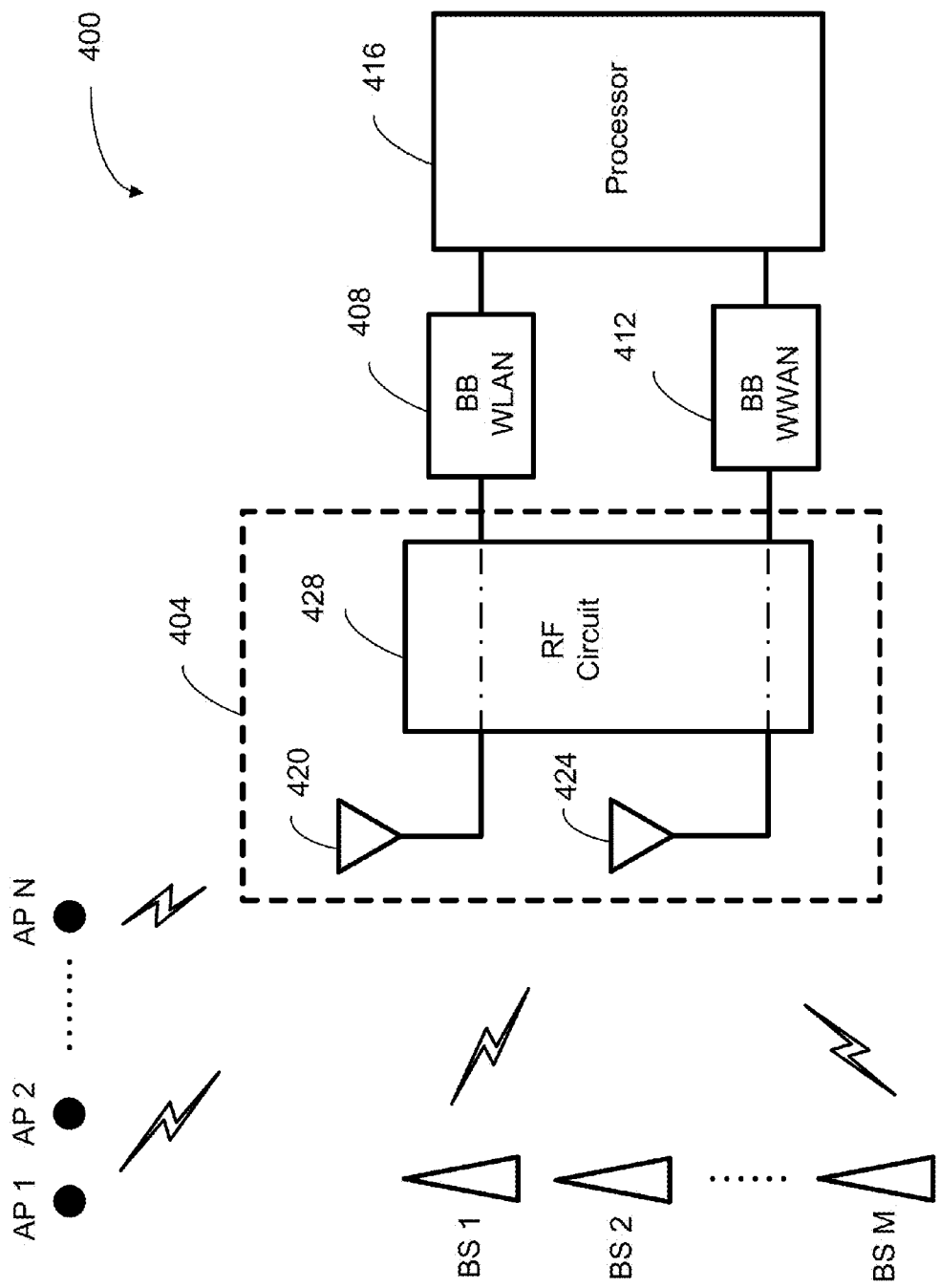
FIG. 4 illustrates an exemplary communication system in a mobile device, configured to communicate with the WLAN and the WWAN.

FIG. 4 illustrates an exemplary communication system 400 in a mobile device, configured to communicate with the WLAN and the WWAN. The system 400 includes an antenna system 404, a baseband 408 for the WLAN, labeled BB WLAN in the figure, a baseband 412 for the WWAN, labeled BB WWAN in the figure, and a processor 416. The processor 416 in the mobile device may be coupled to various peripheral elements such a keyboard, a speaker, a screen, sensors, memories and others, in addition to the basebands 408 and 412, which can be modems. The processor 416 serves as a central core controlling the antenna system 404 and other subsystems, components and peripherals in the mobile device and performing various algorithms, and is configured to be located at an appropriate place in the device. The processor 416 may be located with one or both of the basebands 408 and 412, or externally to the air interface section that includes the antenna system 404 and the basebands 408 and 412, as illustrated in the example of FIG. 4. A local logic section may be added within the antenna system 404 to enhance the control functions enabled by the processor 416 by including a control line between the processor 416 and the local logic section. Alternatively, part of all of the processor 416 may be located in the antenna system 404. The communication system 400 is configured by use of a wireless network interface, for example, to be capable of operating with the WLAN through access points, labeled AP 1, AP 2 . . . and AP N, and the WWAN through base stations, labeled BS 1, BS 2 . . . and BS M. The antenna system 404 includes an antenna 420 configured to transmit and receive WLAN signals and an antenna 424 configured to transmit and receive WWAN signals. The transmit and receive functions may be included in one antenna or separated between a transmit antenna and a receive antenna, respectively. The antenna system further includes an RF circuit 428 coupled to the antennas 420 and 424, where the RF circuit 428 includes components and modules such as power amplifiers, filters, duplexers, low noise amplifies and matching networks to process the RF signals. Part or all of the RF circuit 428 may be configured to be located outside the antenna system 404, or the entire RF circuit 428 may be configured to be located within the antenna system 404, as illustrated in the example of FIG. 4. The antennas 420 and 424 are coupled to the basebands 408 and 412, respectively, through the RF circuit 428, for the WLAN and WWAN communication.

Signal levels in terms of signal strength and quality in a network may be assessed by using channel quality metrics such as data rate (in bps), signal-to-noise ratio (SNR), received signal strength indicator (RSSI), signal-to-interference-plus-noise ratio (SINR), throughput and others. One or more channel quality metrics may be used depending on underlying applications, performance priorities, data acquisition methods, and so on. Information on the channel quality metrics may be acquired through sampling and/or testing, for example. First, when the system 400 is turned on, initial testing may be conducted to identify available WLAN and WWAN connections in the area. For example, the processor 416 may be configured to control the system to sample SNR and acknowledge the connections that have the SNR value above a certain predetermined threshold to be the available connections. Through such availability testing, the WLAN connections with the access points AP 1, AP 2 . . . and AP N may be found to be available, and the WWAN connections with the base stations BS 1, BS 2 . . . and BS M may be found to be available for the system 400 of FIG. 4. During the initial availability testing, the processor 416 may acquire information associated with the available WLAN and WWAN connections, such as costs, security levels, frequency bands, nominal coverage ranges and other network properties. Alternatively, part or all of the information may be pre-stored in a memory or a firmware in the system 400 with occasional updates, or estimated by the processor 416 based on the history. Based on the stored or acquired information, user's inputs and preferences, applications settings and rules and various other conditions, the processor 416 may be configured to manage priorities, such as emergencies and user preferences. Under nominal circumstances, once the available connections are identified, the processor 416 may proceed to link the system 400 to the WLAN by activating the WLAN antenna 420 and associated chain. This priority to have a WLAN connection is based on the fact that the cost of the WLAN access is normally lower than that of the WWAN access. In some exceptional cases, the cost of the WWAN may be lower than that of the WLAN, for example, in a certain hotel or airport. In such a case, the priority goes to the WWAN, and the processor 416 may proceed to link the system 400 to the WWAN by activating the WWAN antenna 424 and associated chain. Another exception may be an emergency situation, such as a call to 911, sending an urgent business mail, or quickly downloading important information, where the priority is set such that an optimum connection with good signal strength and quality be obtained irrespective of cost, WLAN, WLAN or other conditions.

In cases other than cost exceptions, emergencies or other specific conditions or preferences, the priority goes to the WLAN according to the WLAN-first scheme, and the processor 416 is configured to activate the WLAN antenna 420 and associate chain in the system 400. The WLAN antenna 420 may be configured to be a modal antenna that has multiple modes corresponding to multiple radiation patterns. As explained with reference to FIG. 2, the switches coupled to the parasitic elements of the modal antenna 420 can be controlled by the processor 416 to generate different radiation patterns, hence different beam directivities. Supposing it is found through the availability testing that connections to N access points, AP 1, AP 2 . . . and AP N, are available in the area, and the WLAN antenna 420 is configured to be a modal antenna having L different modes, there are a total of N×L possible configurations for the WLAN connectivity. The optimum configuration among the N×L configurations may be obtained based on one or more channel quality metrics to assess the signal strength and quality. For example, the processor 416 may be configured to control the system to sample SNR associated with each configuration and acknowledge one configuration providing the optimum SNR, where the configuration includes a combination of one mode selected from the L modes and one connection selected from the N WLAN connections associated respectively with the access points AP 1, AP 2 . . . and AP N. The sampling may be repeated with a certain interval, so that when the signal with the original connection deteriorates, the processor 416 can select another configuration that provides the optimum signal level in terms of SNR. Alternatively, the processor 416 may be configured to start the sampling of SNR on the N×L available configurations when the original signal level deteriorate to a first threshold, and thereafter to trigger the switching to a different configuration that provides the optimum signal level when the original signal level further deteriorates to a second threshold.

Therefore, when the WLAN signal with the original access point deteriorates, or when the user moves away from the range with the acceptable WLAN signal level, the above mechanism allows for switching to another configuration having an access point and a mode that provides the acceptable signal level, or recovering the signal level from the original access point by changing the mode to another that has an extended beam directivity. Turning back to the example illustrated in FIG. 1, the present WLAN-first scheme may be explained as follows based on the use of a modal antenna for the WLAN antenna 420. First, the user is at the position 121 and the WLAN connection with the AP 4 is maintained. When the user moves away to the location 122, a different mode with a radiation pattern having a long-range directivity may be selected from the multiple modes that the WLAN modal antenna 420 has, so as to maintain the WLAN connection with the AP 4. When the user moves to the location 123, another mode with a radiation pattern having a relatively short-range directivity may be selected to maintain the WLAN connection with the AP 4. Thereafter, a strong signal, in terms of SNR or other quality metrics, may be detected from the AP 7 at the location 124, and a certain mode is selected to optimize the WLAN connection with the AP 7. When the user moves to the location 125, the signal strength and quality from the AP 7 deteriorate, and a new WLAN connection is selected by using a configuration having the connection with the AP 8 and a mode with a radiation pattern having a relatively long-range directivity. At the location 126, another mode with a different directivity is selected to maintain the WLAN connection with the AP 8.

The inter-cell handoff, i.e., the WWAN horizontal handoff, can be carried out by using a conventional antenna with a conventional handoff scheme. However, in addition to configuring the WLAN antenna 420 to be a modal antenna, the WWAN antenna 424 may also be configured to be modal, providing functional flexibility and possible size reduction of the system. In this case, once a WWAN connection is determined to be used according to a certain priority, the processor 416 may control the WWAN modal antenna 424 to select a WWAN connection with the optimum signal level. Supposing it is found through the availability testing that connections to M base stations, BS 1, BS 2 . . . and BS M, are available in the area, and the WWAN antenna 424 is configured to be a modal antenna having K different modes, there are a total of M×K possible configurations for the WWAN connectivity. The optimum configuration among the M×K configurations may be obtained based on one or more channel quality metrics to assess the signal strength and quality. For example, the processor 416 may be configured to sample SNR associated with each configuration and acknowledge one configuration providing the optimum SNR, where the configuration includes a combination of one mode selected from the K modes and one connection selected from the M WWAN connections associated respectively with the base stations BS 1, BS 2 . . . and BS M. The sampling may be repeated with a certain interval, so that when the signal with the original connection deteriorates, the processor 416 can select another configuration that provides the optimum signal level in terms of SNR. Alternatively, the processor 416 may be configured to start the sampling of SNR on the M×K available configurations when the original signal level deteriorate to a first threshold, and thereafter to trigger the switching to a different configuration that provides the optimum signal level when the original signal level further deteriorates to a second threshold.

As mentioned earlier, when the system 400 is turned on, the initial testing may be conducted to identify available WLAN and WWAN connections in the area. For example, the processor 416 may be configured to control the system to sample SNR, and acknowledge the connections that have the SNR value above a certain predetermined threshold to be the available connections. Since this testing is to check the availability or usability of possible connections, the threshold may be predetermined to be rather low. However, the signal strength and quality may vary depending on the environment, for example, due to interference, absorption, distortion and various other factors caused by diffracting, shadowing or blocking of signal paths by obstacles and/or weather conditions. In some instances, inferences may be caused by the way the user places his head or hand near the handset. Occasionally, one or more of the coverage regions may not be available due to system or device malfunctions in the networks. In addition to these temporal signal variations, the user may move around during a phone conversation, a data session or an application session to a location where some of the connections are simply not usable because the signal level becomes too low to surpass even the threshold used for the availability testing. Therefore, it is necessary to run the availability testing from time to time or with a certain time interval to identify next available connections in the area.

Figure 5:
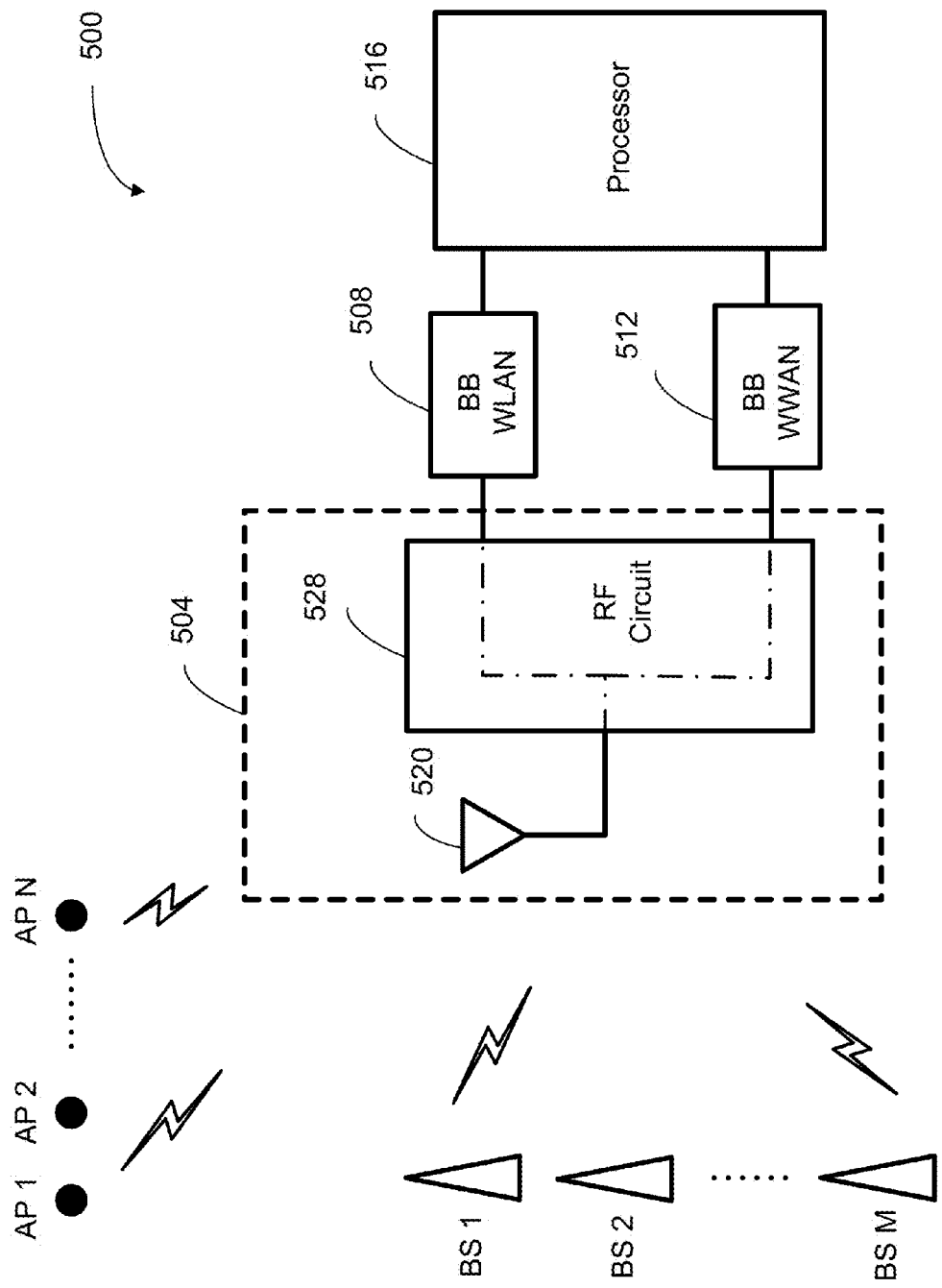
FIG. 5 illustrates an exemplary communication system in a mobile device, configured to communicate with the WLAN and the WWAN by using one modal antenna.

The antennas 420 and 424 of the system 400 may be replaced with one antenna if the antenna is capable of operating for multiple frequency bands covering both WWAN and WLAN frequency ranges. FIG. 5 illustrates an exemplary communication system 500 in a mobile device, configured to communicate with the WLAN and the WWAN by using one modal antenna. The system 500 is similar to the system 400 of FIG. 4, except that the antenna 420 and 424 adapted for the WLAN communication and the WWAN communication, respectively, are replaced with one modal antenna 520 adapted to cover both the WLAN and WWAN bands. Such modal antennas capable of covering multiple bands over a wide frequency range can be realized by using a frequency tuning technique based on a structure having the IMD and parasitic elements coupled with switches. Examples of structures and implementations of such multi-band modal antennas are provided in U.S. Pat. No. 7,830,320, entitled "ANTENNA WITH ACTIVE ELEMENTS," issued on Nov. 9, 2010. The contents of the above patent are incorporated herein by reference.

Specifically in FIG. 5, the system 500 includes an antenna system 504, a baseband 508 for the WLAN, labeled BB WLAN in the figure, a baseband 512 for the WWAN, labeled BB WWAN in the figure, and a processor 516. The processor 516 serves as a central core controlling the antenna system 504 and other subsystems, components and peripherals in the mobile device and performing various algorithms, and is configured to be located at an appropriate place in the device. The processor 516 may be located with one or both of the basebands 508 and 512, or externally to the air interface section that includes the antenna system 504 and the basebands 508 and 512, as illustrated in the example of FIG. 5. A local logic section may be added within the antenna system 504 to enhance the control functions enabled by the processor 516 by including a control line between the processor 516 and the local logic section. Alternatively, part of all of the processor 516 may be located in the antenna system 504. Similar to the system 400 of FIG. 4, the communication system 500 is configured by use of a wireless network interface, for example, to be capable of operating with the WLAN through access points, labeled AP 1, AP 2 . . . and AP N, and the WWAN through base stations, labeled BS 1, BS 2 . . . and BS M. The antenna system 504 includes a multi-band modal antenna 520 configured to transmit and receive WLAN signals and WWAN signals. The transmit and receive functions may be included in one antenna or separated between a transmit antenna and a receive antenna, respectively. The antenna system further includes an RF circuit 528 coupled to the antenna 520, where the RF circuit 528 includes components and modules such as power amplifiers, filters, duplexers, low noise amplifies and matching networks to process the RF signals. Part or all of the RF circuit 528 may be configured to be located outside the antenna system 504, or the entire RF circuit 428 may be configured to be located within the antenna system 504, as illustrated in the example of FIG. 5. The antenna 520 is coupled to the basebands 508 and 512 through the RF circuit 528 for the WLAN and WWAN communication.

In most cases where the cost of the WLAN access is lower than the cost of the WWAN access, the priority may be given to connect the system to the WLAN. However, there are situations where user preferences or considerations involve various factors that may change pre-conceived priorities. For example, in an emergency situation such as a call to 911, sending an urgent business mail, or quickly downloading important information, the user's priority would be to have a connection with the best possible signal strength and quality irrespective of costs, WWAN or WWLAN. In another example, the cost for the WWAN access may exceptionally be lower than the cost of the WLAN access. In yet another example, there may be a cost variation among multiple WWAN accesses (e.g., 3G versus 4G) or among multiple WLAN accesses (e.g., differently managed access points). In yet another example, the user may want to choose a secured connection (e.g., an encrypted WWAN connection instead of an open WLAN connection) to protect his/her data from external viewing or hacking. In yet another example, the user may cross a border from one network coverage to another while running an application, such as playing a game or downloading a video, but want to stay on the original network because 90% of the game or the downloading has completed so that he/she does not want to resume the application in the new network. These priorities in selecting a network connection during a specific time period are in many cases based on user preferences; thus, it is desirable to have a communication system capable of managing priorities and adjusting its configuration accordingly to stay on a network connection satisfying the priority to achieve better QOS.

Figure 6:
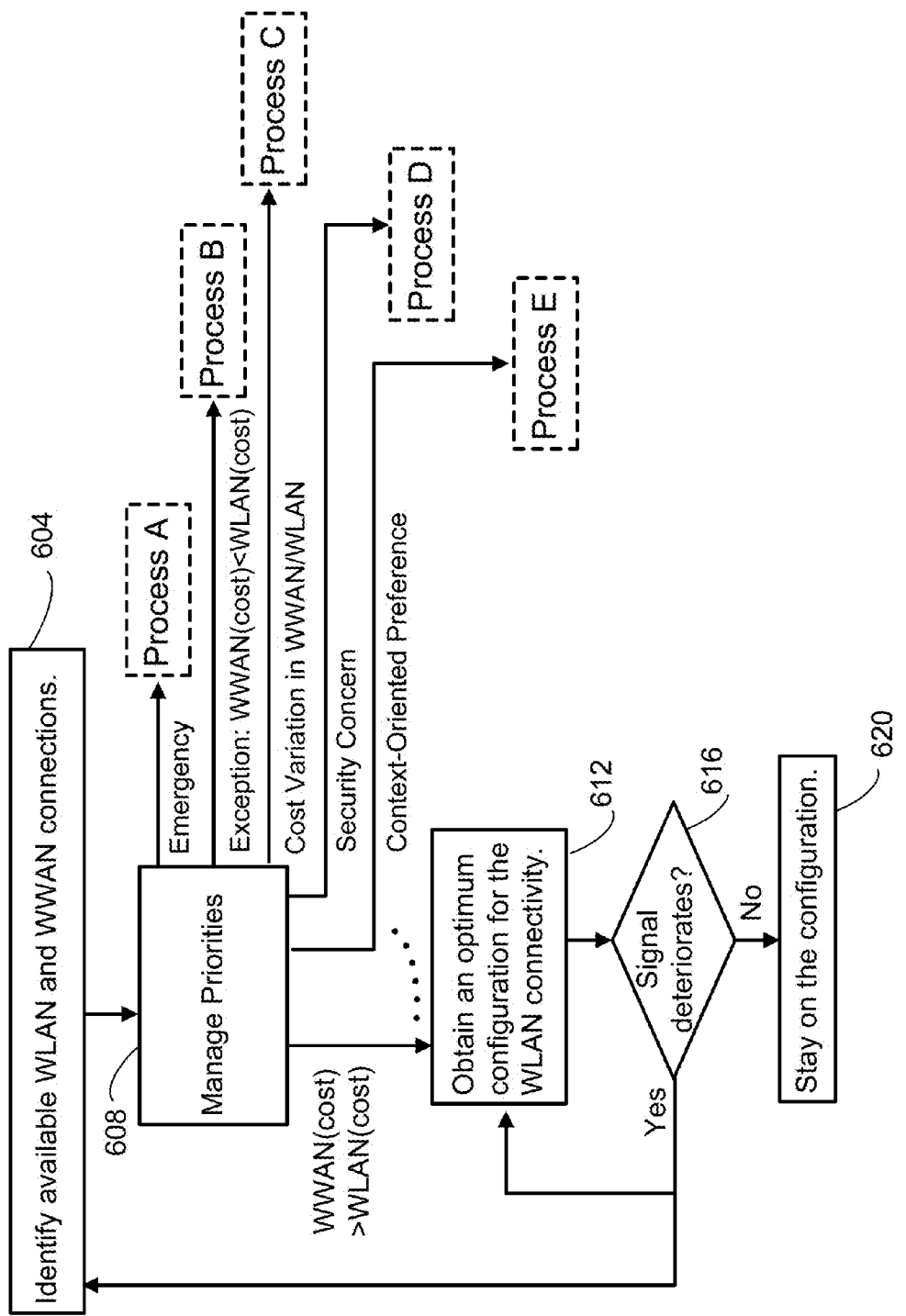
FIG. 6 is a flow chart illustrating exemplary processes of the priority-based wireless communication scheme using the antenna system in FIG. 4 or FIG. 5.

FIG. 6 is a flow chart illustrating exemplary processes of the present priority-based wireless communication scheme using the antenna system 404 or 504. The antenna system 404 in FIG. 4 includes a modal antenna for the WLAN antenna 420. The WWAN antenna 424 may be a conventional antenna, and a conventional inter-cell handoff scheme may be utilized. Alternatively, the WWAN antenna 424 may also be a modal antenna that has multiple modes corresponding to multiple radiation patterns, hence multiple beam directivities. The antenna system 504 in FIG. 5 includes a multi-band modal antenna that has multiple modes corresponding to multiple radiation patterns for multiple bands covering a wide frequency range including the WLAN and the WWAN bands. First, in the step 604, availability testing is conducted to identify available WLAN and WWAN connections in the area where the mobile device is used. The testing may involve sampling of one or more channel quality metrics, such as data rate (in bps), SNR, RSSI, SINR, throughput and others. For example, SNR may be sampled to identify connections that have the SNR value above a certain predetermined threshold. Through the availability testing, the WLAN connections with the access points AP 1, AP 2 . . . and AP N may be found to be available, and the WWAN connections with the base stations BS 1, BS 2 . . . and BS M may be found to be available. Since this testing is to check the availability or usability of possible connections, the threshold may be predetermined to be rather low. During this testing, information on network properties such as costs, security levels, frequency bands, security levels and nominal coverage ranges associated with the individual available connections may also be acquired. Alternatively, part or all of the information may be pre-stored in a memory or a firmware in the system 400 or the system 500 with occasional updates, or estimated by the processor 416 or 516 based on the history. Priorities are managed in the step 608 based on the user's inputs, applications settings and rules, network properties and various other stored or acquired information. For example, cost preferences, emergency handlings, security preferences or other considerations are acknowledged at the step 608, and different processes according to respective priorities may be followed as indicated by the process A, process B, process C, process D, process E and so on in FIG. 6.

Under nominal circumstances where the cost of WLAN access is lower than the cost of the WWAN access, the priority is managed to connect the system to the WLAN. The process for such a WLAN-first communication scheme after the step 608 is continued as illustrated in FIG. 6. In this process, an optimum configuration for the WLAN connectivity is obtained in the step 612 by utilizing the antenna system 404 that includes the modal WLAN antenna 420 or the antenna system 504 that includes the multi-band modal antenna 520. Supposing it is found through the availability testing that connections to N access points, AP 1, AP 2 . . . and AP N, are available in the area, and the modal WLAN antenna 420 or the multi-band modal antenna 520 is configured to have L different modes for the WLAN frequency range, there are a total of N×L possible configurations for the WLAN connectivity. The optimum configuration among the N×L configurations may be obtained based on one or more channel quality metrics to assess the signal strength and quality. Sampling of SNR, for example, may be carried out for each configuration to determine the optimum configuration providing the optimum SNR. As mentioned earlier with reference to FIG. 1, signal deterioration may occur due to temporal signal fading or a change in location of the mobile device in use. Thus, to maintain a connection with the optimum signal level, it is necessary to either keep the original connection by recovering the optimum signal level or find a new connection having the optimum signal level among the remaining available connections. The sampling may be repeated with a certain interval, so that when the signal associated with the original configuration is found to be deteriorating in the checking step 616, another configuration providing an acceptable SNR level may be selected. Alternatively, the sampling of SNR on the N×L available configurations may be started when the original signal level deteriorates to a first threshold, and thereafter the switching to a different configuration that provides the acceptable SNR level may be performed when the original signal level further deteriorates to a second threshold. The signal strength and quality may vary depending on the environment, use conditions or locations, or network conditions. Therefore, some of the available connections may become unusable because the signal level becomes too low to surpass even the threshold used for the availability testing in the step 504. Therefore, it is necessary to run the availability testing by going back to the step 504 from time to time or with a certain time interval to identify next available connections in the area. Unless unacceptable signal degradation occurs at the step 616, the system stays on the selected configuration in the step 620.

Figure 7:
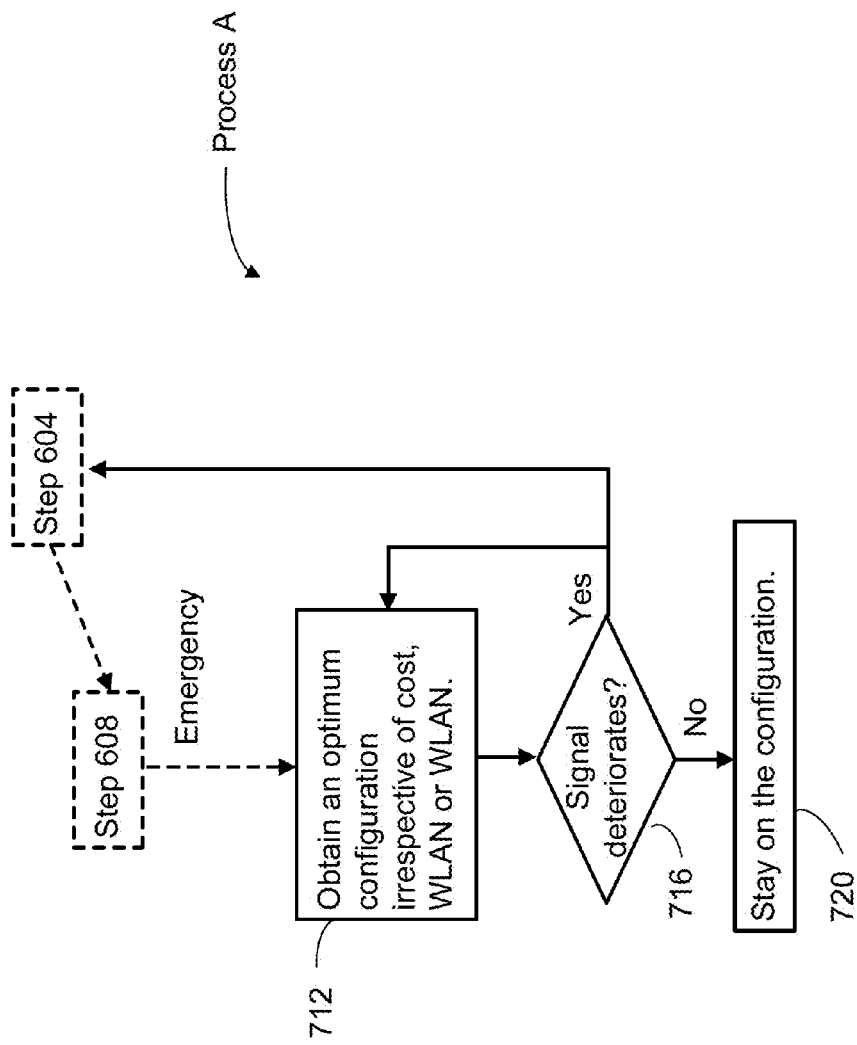
FIG. 7 illustrates the process A where the priority includes handling an emergency.

If the use of the system is for emergency, the priority is managed in the step 608 to have a connection with good signal strength and quality irrespective of cost, WLAN, WWAN or other conditions, and the system is configured to proceed as in the process A illustrated in FIG. 7. An optimum configuration is obtained in the step 712. In the case of configuring the WWAN antenna 424 to be a modal antenna with K modes and the WLAN antenna 420 to be another modal antenna with L modes, there are N×L configurations for the WLAN connectivity and the M×K configurations for the WWAN connectivity, where M is the number of base stations and N is the numbers of access points. Among the N×L configurations for the WLAN connectivity and the M×K configurations for the WWAN connectivity, the optimum configuration having the optimum signal level in terms of signal strength and quality is selected to handle the emergency situation. Testing of each configuration may be conducted by involving sampling of one or more channel quality metrics such as SNR to assess the signal strength and quality to determine the optimum configuration. As mentioned earlier with reference to FIG. 1, signal deterioration may occur due to temporal signal fading or a change in location of the mobile device in use. Thus, to maintain a connection with the optimum signal level, it is necessary to either keep the original connection by recovering the optimum signal level or find a new connection having the optimum signal level among the remaining available connections. The sampling may be repeated with a certain interval, so that when the signal associated with the original configuration is found to be deteriorating in the checking step 716, another configuration providing the optimum signal level may be selected. Alternatively, the sampling of one or more channel quality metrics on the (N×L+M×K) available configurations may be started when the original signal level deteriorates to a first threshold, and thereafter the switching to a different configuration that provides the optimum signal level may be performed when the original signal level further deteriorates to a second threshold. The similar procedure can be taken for the case of having the multi-band modal antenna 520 that can provide L modes for the WLAN frequency range and K modes for the WWAN frequency range. Furthermore, the similar procedure can be taken for the case of configuring the WWAN antenna 424 to be a conventional antenna having one fixed mode and the WLAN antenna 420 to be a modal antenna with L modes. The testing may be conducted for the (N×L+M×1) configurations to identify the optimum configuration in this case. As mentioned earlier, depending on the environment, use conditions or locations, or network conditions, some of the available connections may become unusable because the signal level becomes too low to surpass even the threshold used for the availability testing in the step 604. Therefore, it is necessary to run the availability testing by going back to the step 604 from time to time or with a certain time interval to identify next available connections in the area. Unless unacceptable signal degradation occurs at the step 716, the system stays on the selected configuration in the step 720.

Figure 8:
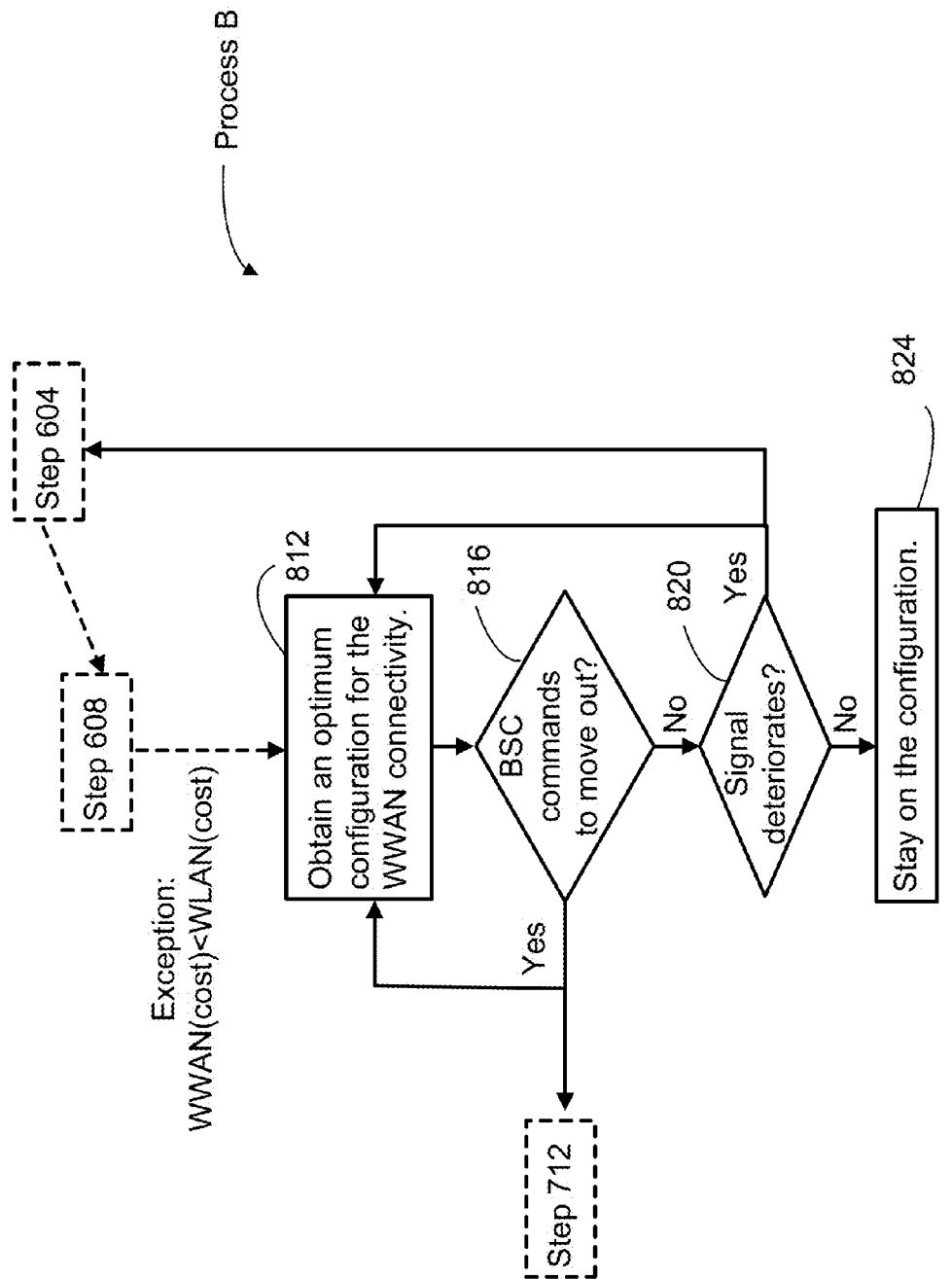
FIG. 8 illustrates the process B where the priority includes having a WWAN connection due to its lower cost than the WLAN as an exceptional case.

If an exceptional case has occurred, where the cost of the WWAN is lower than the cost of the WLAN, the priority is managed in the step 608 to connect the system to the WWAN as in the process B illustrated in FIG. 8. An optimum configuration among the available WWAN configurations is obtained in the step 812. In the case of configuring the WWAN antenna 424 to be a modal antenna having K different modes, the optimum configuration having the optimum signal level in terms of signal strength and quality is identified in the step 812 among the M×K configurations for the WWAN connectivity, where M is the number of available base stations. The similar procedure can be taken for the case of having the multi-band modal antenna 520 that can provide K modes for the WWAN frequency range. There are instances where a base station needs to remove some users, because the capacity is limited or the channel gets crowded. Such a decision may be made by a base station controller (BCS) controlling the base station. In the step 816, it is checked if the BSC commands the system to move out of the WWAN connection with the original base station. If the other WWAN connections are available, another optimum configuration among the remaining WWAN connections is selected by going back to the step 812. If all the WWAN channels are crowed, the BCS may command the system to perform a vertical handoff to the WLAN, and accordingly the system proceeds to the step 712, where an optimum configuration for the WLAN connectivity is obtained. Unless the BCS commands to move out, the original configuration is maintained until the signal is found to be deteriorating in the step 820. As mentioned earlier with reference to FIG. 1, signal deterioration may occur due to temporal signal fading or a change in location of the mobile device in use. Thus, to maintain a connection with the optimum signal level, it is necessary to either keep the original connection by recovering the optimum signal level or find a new connection having the optimum signal level among the remaining available connections. If the signal is deteriorating, another optimum configuration for the WWAN connectivity is obtained by going back to the step 812. As in the previous processes, depending on the environment, use conditions or locations, or network conditions, some of the available WWAN connections may become unusable because the signal level becomes too low to surpass even the threshold used for the availability testing in the step 604. Therefore, it is necessary to run the availability testing by going back to the step 604 from time to time or with a certain time interval to identify next available connections in the area. Unless unacceptable signal degradation occurs at the step 820, the system stays on the selected configuration in the step 824.

Figure 9:
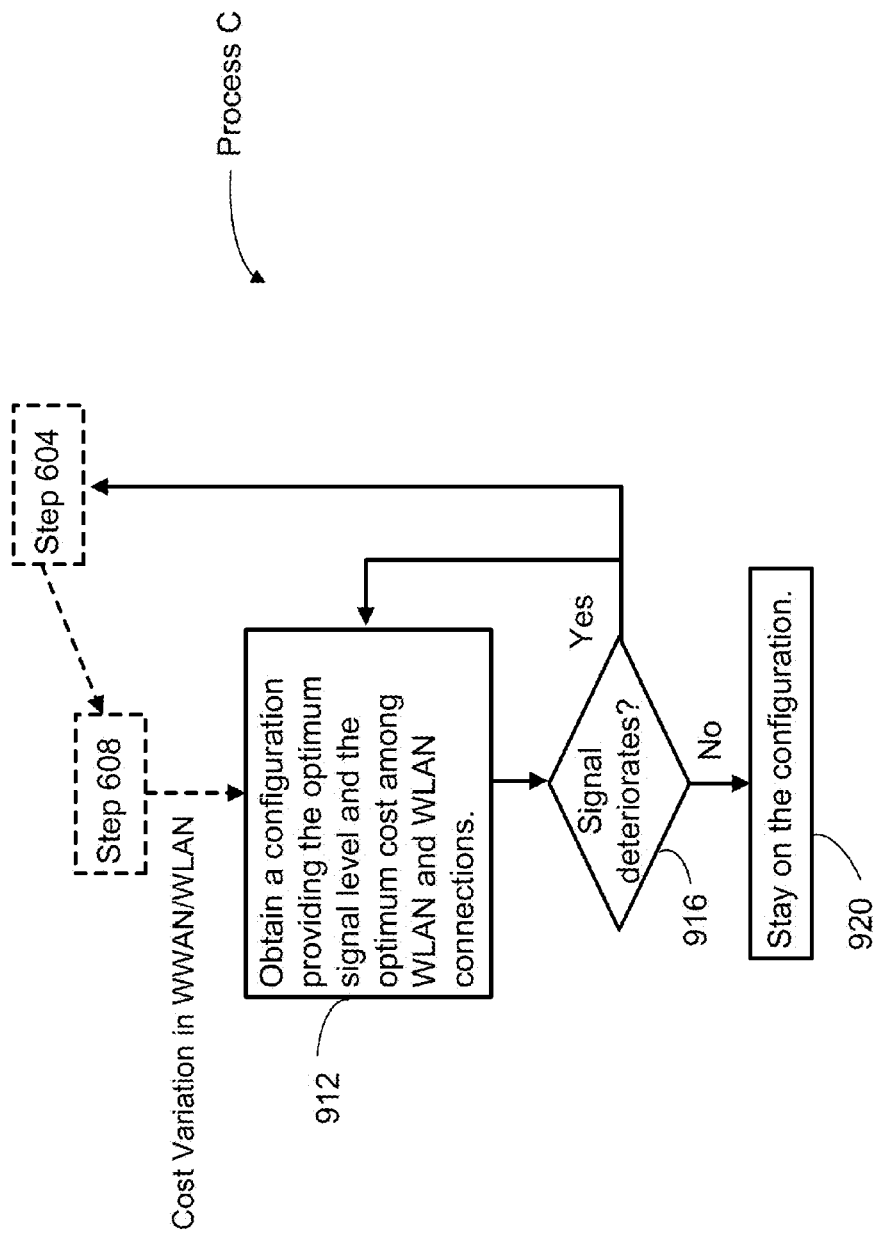
FIG. 9 illustrates the process C where the priority includes optimizing the cost due to a cost variation among the available connections.

There may be some instances where a cost variation is found among multiple WWAN accesses (e.g., 3G versus 4G) or among multiple WLAN accesses (e.g., differently managed access points) or both. When the mobile device in use is in such an area, the priority may be set to have a connection providing the optimum cost among the available connections in the step 608, and the system may be configured to proceed as in the process C illustrated in FIG. 9. The optimum cost in this case may be the lowest cost among the available network connections, or a cost that falls within the range the user may predetermine. The configuration is obtained in the step 912 to have a WWAN connection or a WLAN connection that incurs the optimum cost. Unlike the case of emergency as in the process A, signal strength or quality may be of a secondary concern in this cost-conscious scenario. However, unacceptable signal deterioration may occur due to temporal signal fading or a change in location of the mobile device in use. Thus, to maintain a connection with the optimum cost, it is necessary to either keep the original connection by recovering the optimum signal level or find a new connection having the optimum signal level and the optimum cost among the remaining available connections. In the case of configuring the WWAN antenna 424 to be a modal antenna with K modes and the WLAN antenna 420 to be another modal antenna with L modes, there are N×L configurations for the WLAN connectivity and the M×K configurations for the WWAN connectivity, where M is the number of base stations and N is the numbers of access points. The configuration providing the optimum cost is selected in the step 912 among the WLAN and WWAN connections. To assess the signal level in terms of strength and quality, testing of the configurations may be conducted by involving sampling of one or more channel quality metrics such as SNR. The sampling may be repeated with a certain interval, so that when the signal associated with the selected configuration is found to be deteriorating in the checking step 916, another configuration providing the optimum signal level and the optimum cost among the remaining configurations may be selected. Alternatively, the sampling of one or more channel quality metrics on the configurations may be started when the original signal level deteriorates to a first threshold, and thereafter the switching to a different configuration that provides the optimum signal level and the optimum cost may be performed when the original signal level further deteriorates to a second threshold. The similar procedure can be taken for the case of having the multi-band modal antenna 520 that can provide L modes for the WLAN frequency range and K modes for the WWAN frequency range. As mentioned earlier, depending on the environment, use conditions or locations, or network conditions, some of the available connections may become unusable because the signal level becomes too low to surpass even the threshold used for the availability testing in the step 604. Therefore, it is necessary to run the availability testing by going back to the step 604 from time to time or with a certain time interval to identify next available connections in the area. Unless unacceptable signal degradation occurs at the step 916, the system stays on the selected configuration in the step 920.

Figure 10:
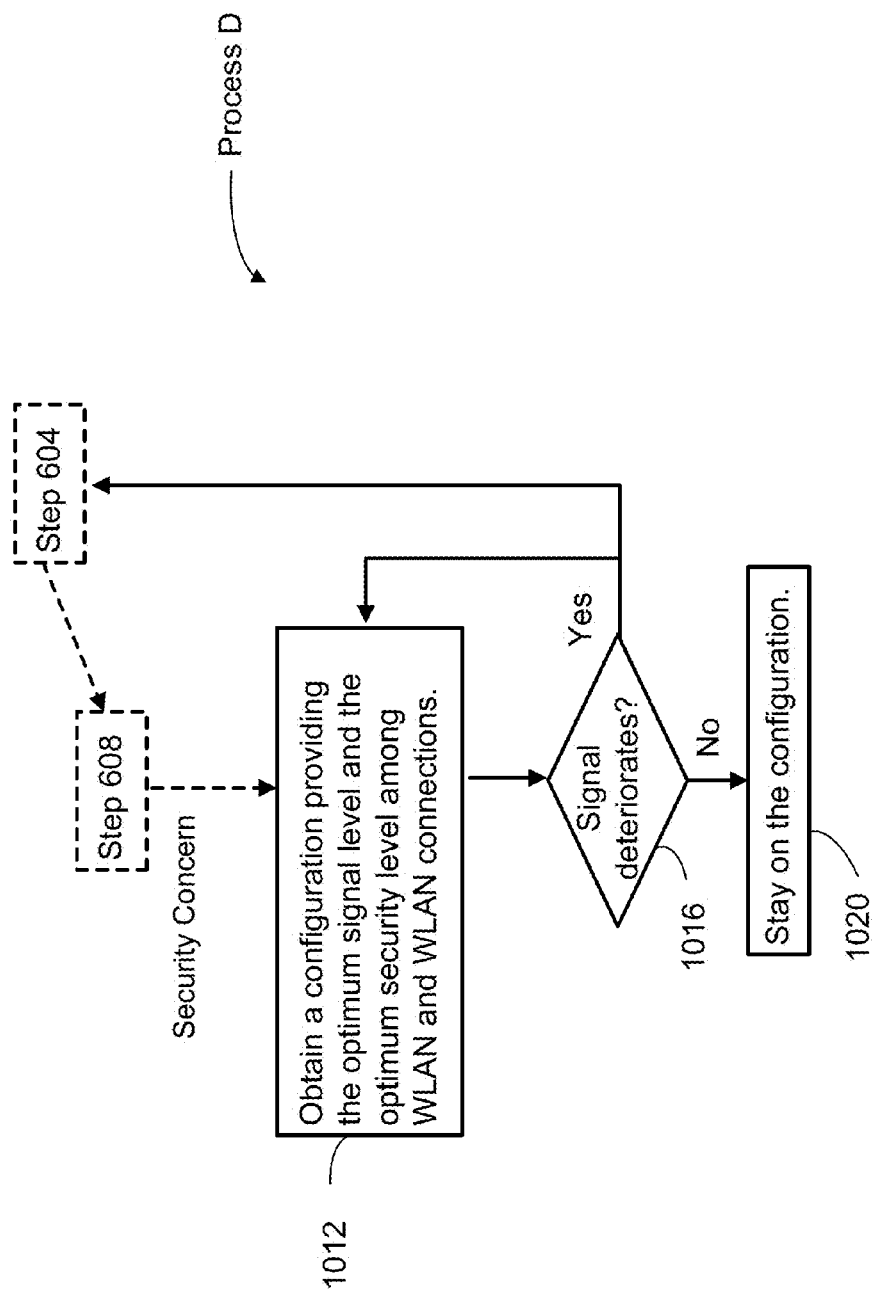
FIG. 10 illustrates the process D where the priority includes optimizing the security.

There may be instances where the user wants to choose a secured connection to protect his/her data from external viewing or hacking. The mobile device in use may be in an area where network connections with different security levels are provided, for example, an encrypted WWAN connection with a high degree of security, an open WLAN connection available to anyone for free of charge, a WLAN connection available to only selected people having the password, and WLAN connections with various encryption levels. Depending on the confidentiality level of the data or document handled by the mobile device in use or the culture and the safety level of the country the user roamed into, the user may want to have an option of choosing a secured connection. Accordingly, the priority may be set to have a connection providing the optimum security level among the available connections in the step 608, and the system may be configured to proceed as in the process D illustrated in FIG. 10. The optimum security level in this case may be a highest security level with a highest degree of the encryption protection among the available connections, or a certain security level that the user selects based on his/her comfort level. The configuration is obtained in the step 1012 to have a WWAN connection or a WLAN connection that provides the optimum security level. Unlike the cost-conscious scenario such as in the process C, costs may be of secondary concern in the present security-conscious scenario. Furthermore, unlike the case of emergency as in the process A, signal strength or quality may also be of a secondary concern in the present scenario. However, unacceptable signal deterioration may occur due to temporal signal fading or a change in location of the mobile device in use. Thus, to maintain a secured connection, it is necessary to either keep the original connection by recovering the optimum signal level or find a new connection having the optimum security level and the optimum signal level among the remaining available connections. In the case of configuring the WWAN antenna 424 to be a modal antenna with K modes and the WLAN antenna 420 to be another modal antenna with L modes, there are N×L configurations for the WLAN connectivity and the M×K configurations for the WWAN connectivity, where M is the number of base stations and N is the numbers of access points. The configuration providing the optimum security level and the optimum signal level is selected in the step 1012 among the WLAN and WWAN connections. To assess the signal level in terms of strength and quality, testing of the configurations may be conducted by involving sampling of one or more channel quality metrics such as SNR. The sampling may be repeated with a certain interval, so that when the signal associated with the selected configuration is found to be deteriorating in the checking step 1016, another configuration providing the optimum security level and the optimum signal level among the remaining configurations may be selected. Alternatively, the sampling of one or more channel quality metrics on the configurations may be started when the original signal level deteriorates to a first threshold, and thereafter the switching to a different configuration that provides the optimum signal level and the optimum security level may be performed when the original signal level further deteriorates to a second threshold. The similar procedure can be taken for the case of having the multi-band modal antenna 520 that can provide L modes for the WLAN frequency range and K modes for the WWAN frequency range. As mentioned earlier, depending on the environment, use conditions or locations, or network conditions, some of the available connections may become unusable because the signal level becomes too low to surpass even the threshold used for the availability testing in the step 604. Therefore, it is necessary to run the availability testing by going back to the step 604 from time to time or with a certain time interval to identify next available connections in the area. Unless unacceptable signal degradation occurs at the step 1016, the system stays on the selected configuration in the step 1020.

Figure 11:
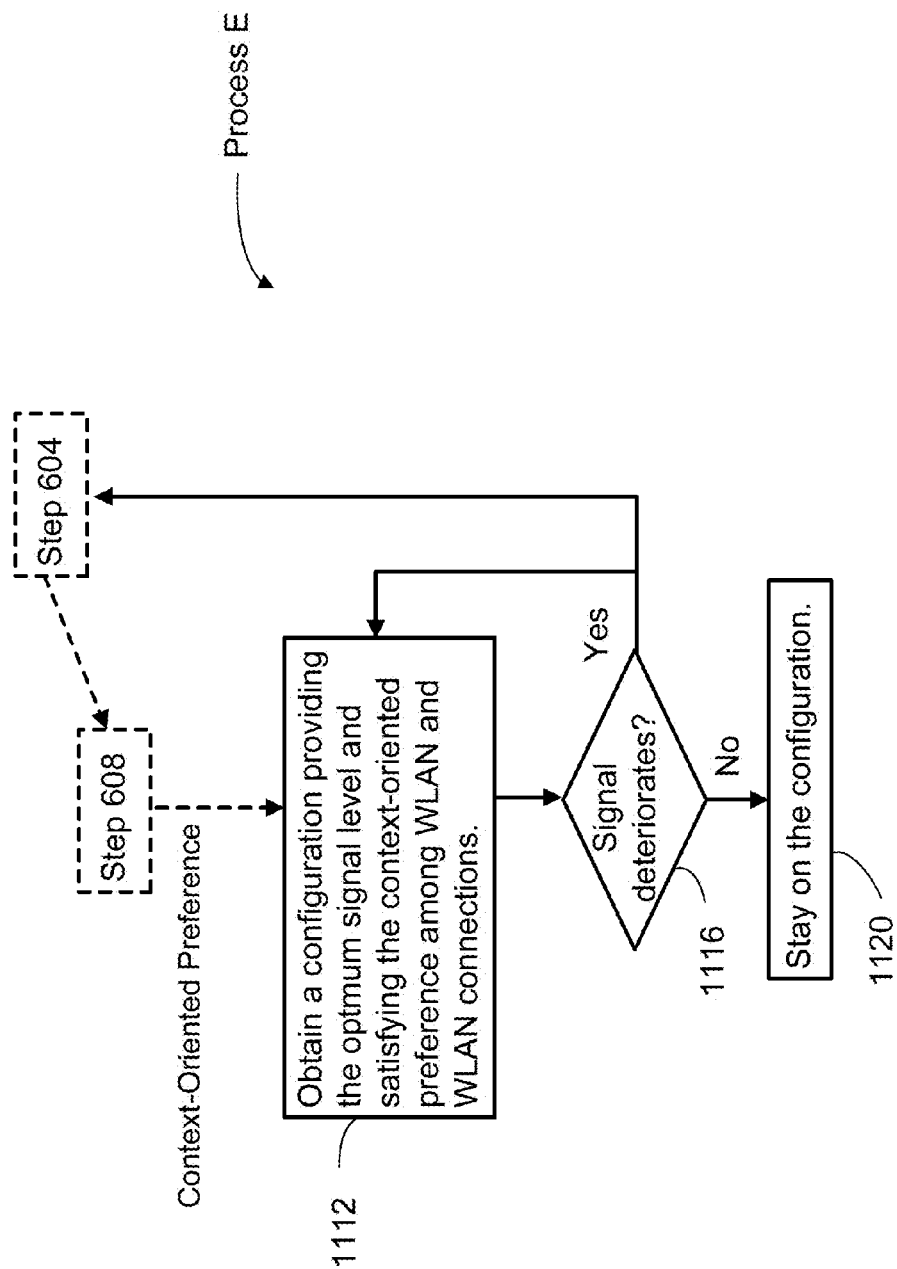
FIG. 11 illustrates the process E where the priority includes satisfying a context-oriented preference.

Depending on the application or the task the user is performing, the user may want to have an option of choosing a connection that satisfies his/her preference while using the mobile device. For example, the user may cross a border from one network coverage to another while running an application, such as playing a game or downloading a video, but want to stay on the original network connection because 90% of the game or the downloading has completed and he/she does not want to change the network connection that may trigger restarting the application. Such context-oriented preferences may be inputted by the user to allow for greater flexibility in choosing a connection of his/her choice. For example, various context-oriented preferences may be preset and managed in the step 608 using certain metrics, for example, in terms of file sizes, costs, rules, settings and other conditions associated with applications or tasks. Accordingly, the priority may be set to have a connection satisfying the user's context-oriented preference in the step 608, and the system may be configured to proceed as in the process E illustrated in FIG. 11. The configuration is obtained in the step 1112 to have a WWAN connection or a WLAN connection that provides the connection the user prefers. Unlike the case of emergency as in the process A, signal strength or quality may be of a secondary concern in the present scenario. However, unacceptable signal deterioration may occur due to temporal signal fading or a change in location of the mobile device in use. Thus, to maintain a preferred connection, it is necessary to either keep the original connection by recovering the optimum signal level or find a new connection satisfying the user's preference while providing the optimum signal level among the remaining available connections. In the case of configuring the WWAN antenna 424 to be a modal antenna with K modes and the WLAN antenna 420 to be another modal antenna with L modes, there are N×L configurations for the WLAN connectivity and the M×K configurations for the WWAN connectivity, where M is the number of base stations and N is the numbers of access points. The configuration providing the optimum signal level and satisfying the user's preference is selected in the step 1112 among the available WLAN and WWAN connections. To assess the signal level in terms of strength and quality, testing of the configurations may be conducted by involving sampling of one or more channel quality metrics such as SNR. The sampling may be repeated with a certain interval, so that when the signal associated with the selected configuration is found to be deteriorating in the checking step 1116, another configuration providing the optimum signal level and satisfying the user's preference among the remaining configurations may be selected. Alternatively, the sampling of one or more channel quality metrics on the configurations may be started when the original signal level deteriorates to a first threshold, and thereafter the switching to a different configuration that provides the optimum signal level and satisfies the user's preference may be performed when the original signal level further deteriorates to a second threshold. The similar procedure can be taken for the case of having the multi-band modal antenna 520 that can provide L modes for the WLAN frequency range and K modes for the WWAN frequency range. As mentioned earlier, depending on the environment, use conditions or locations, or network conditions, some of the available connections may become unusable because the signal level becomes too low to surpass even the threshold used for the availability testing in the step 604. Therefore, it is necessary to run the availability testing by going back to the step 604 from time to time or with a certain time interval to identify next available connections in the area. Unless unacceptable signal degradation occurs at the step 1116, the system stays on the selected configuration in the step 1120.

The above processes A-E as well as the WLAN-first process merely represent a few examples of selecting network connections based on priorities. There may be other cases where different priorities are set and managed, and the different selection processes may be followed accordingly. Furthermore, two or more of these processes based on respective priorities may be combined, part of one process may be combined with one or more others, or two or more of the sub-processes may be combined to handle complex priority settings.

What is claimed is:

1. A communication system adapted to operate with a plurality of network connections, comprising;
    a first modal antenna,
    the first modal antenna comprising:
        an antenna radiating element positioned above a ground plane forming an antenna volume therebetween,
        a first parasitic element positioned outside the antenna volume and adjacent to the radiating element, the first parasitic element being coupled to a first active element and the first active element being further coupled to the ground plane, wherein the first active element is adapted to vary a coupling between the first parasitic element and the ground plane, and
        a second parasitic element positioned within the antenna volume, the second parasitic element being coupled to a second active element and the second active element being further coupled to the ground plane, wherein the second active element is adapted to vary a coupling between the second parasitic element and the ground plane;
    the first modal antenna being selectively configurable about a plurality of possible first antenna modes, wherein the first modal antenna is adapted to produce a distinct radiation pattern in each of the first antenna modes, the first modal antenna being configured to communicate with one or more access points of a wireless local area network (WLAN);
    a second antenna having at least one second antenna mode thereof, the second antenna being configured to communicate with one or more cellular base stations of a wireless wide area network (WWAN); and
    a processor coupled to each of the first modal antenna and the second antenna;
    wherein the processor is configured to:
        identify one or more first connections associated with the one or more access points of the WLAN, respectively, and one or more second connections associated with the one or more cellular base stations of the WWAN, respectively, said first and second connections being available in an area where the communication system is located;
        select one of the first and second connections for connecting the communication system to one of the WLAN or the WWAN networks; and
        communicate signals to at least one of the first modal antenna and the second antenna to obtain a configuration thereof that satisfies a priority and provides an optimum signal level by selecting a mode and a network connection for the configuration for each time period.

2. The communication system of claim 1, wherein the priority comprises communication with the WLAN, and the configuration comprises a combination of a mode selected from the plurality of first modes and a network connection selected from the one or more first connections to have the network connection to the WLAN with the optimum signal level.

3. The communication system of claim 1, wherein the priority comprises an emergency, and the configuration comprises a combination of a mode selected from a group consisting of the plurality of first modes and the at least one second mode and a network connection selected from a group consisting of the one or more first connections and the one or more second connections to have the network connection with the optimum signal level.

4. The communication system of claim 1, wherein the priority comprises communication with the WWAN, and the configuration comprises a combination of a mode selected from the at least one second mode and a network connection selected from the one or more second connections to have the network connection to the WWAN with the optimum signal level.

5. The communication system of claim 1, wherein
the priority comprises optimization of cost, and the configuration comprises a combination of a mode selected from a group consisting of the plurality of first modes and the at least one second mode and a network connection selected from a group consisting of the one or more first connections and the one or more second connections to have the network connection with an optimum cost and the optimum signal level.

6. The communication system of claim 1, wherein
the priority comprises optimization of security, and the configuration comprises a combination of a mode selected from a group consisting of the plurality of first modes and the at least one second mode and a network connection selected from a group consisting of the one or more first connections and the one or more second connections to have the network connection with an optimum security level and the optimum signal level.

7. The communication system of claim 1, wherein
the priority comprises a context-oriented preference, and the configuration comprises a combination of a mode selected from a group consisting of the plurality of first modes and the at least one second mode and a network connection selected from a group consisting of the one or more first connections and the one or more second connections to have the network connection meeting the context-oriented preference with the optimum signal level.

8. The communication system of claim 1, wherein
the processor is further configured to perform a first test to identify the one or more first connections and the one or more second connections by sampling one or more channel quality metrics, wherein the channel quality metrics comprise data rate, signal-to-noise ratio, received signal strength indicator, signal-to-interference-plus-noise ratio and throughput.

9. The communication system of claim 1, wherein
the processor is further configured to perform a second test to select the mode and the network connection by sampling one or more channel quality metrics to assess the signal level, wherein the channel quality metrics comprise data rate, signal-to-noise ratio, received signal strength indicator, signal-to-interference-plus-noise ratio and throughput.

10. The communication system of claim 1, wherein
the processor is further configured to manage priorities based on at least part of a group consisting of information on network properties including security levels and costs, user's inputs and preferences, applications settings and rules, and conditions.

11. The communication system of claim 1, wherein
the second antenna is configured to be a second modal antenna having a plurality of second modes corresponding to a plurality of second radiation patterns.

12. A method of wireless communication using a plurality of network connections sequentially, comprising steps of:
providing a wireless communication device including a first modal antenna,
the first modal antenna comprising:
an antenna radiating element positioned above a ground plane forming an antenna volume therebetween,
a first parasitic element positioned outside the antenna volume and adjacent to the radiating element, the first parasitic element being coupled to a first active element and the first active element being further coupled to the ground plane, wherein the first active element is adapted to vary a coupling between the first parasitic element and the ground plane, and
a second parasitic element positioned within the antenna volume, the second parasitic element being coupled to a second active element and the second active element being further coupled to the ground plane, wherein the second active element is adapted to vary a coupling between the second parasitic element and the ground plane;
the first modal antenna being configurable about a plurality of possible first antenna modes, wherein the first modal antenna is adapted to produce a distinct radiation pattern in each of the first antenna modes, the first modal antenna being adapted to communicate with one or more access points of a wireless local area network (WLAN), and the device further including a second antenna for transmitting and receiving signals with one or more cellular base stations of a wireless wide area network (WWAN), the second antenna having at least one second antenna mode associated therewith;
identifying one or more first connections associated with the one or more access points of the WLAN, respectively, and further identifying one or more second connections associated with the one or more cellular base stations of the WWAN, respectively, said first and second connections being available in an area proximal to the wireless communication device; and
for each time period, selecting one of the first and second connections for connecting the wireless communication device to one of the WLAN and WWAN networks, wherein said one of the first and second connections is selected based on at least one of: a priority and a signal level metric; and
communicating signals to at least one of the first and second antennas to obtain a configuration thereof for establishing a link with the selected connection and corresponding network, wherein the configuration is achieved by configuring the mode of at least one of the first and second antennas.

13. The method of claim 12, wherein
the priority comprises communication with the WLAN, and the selecting step comprises selecting a mode from the plurality of first modes and a network connection from the one or more first connections to obtain the configuration connections to have the network connection to the WLAN with the optimum signal level.

14. The method of claim 12, wherein
the priority comprises an emergency, and the selecting step comprises selecting a mode from a group consisting of the plurality of first modes and the at least one second mode and a network connection from a group consisting of the one or more first connections and the one or more second connections to obtain the configuration to have the network connection with the optimum signal level.

15. The method of claim 12, wherein
the priority comprises communication with the WWAN, and the selecting step comprises selecting a mode from the at least one second mode and a network connection from the one or more second connections to obtain the configuration to have the network connection to the WWAN with the optimum signal level.

16. The method of claim 15, further comprising steps of:
performing a vertical handoff to the WLAN; and
second selecting a mode from the plurality of first modes and a network connection from the one or more first connections, wherein
a base station controller commands to move out of the network connection selected in the selecting step.

17. The method of claim 12, wherein
the priority comprises optimization of cost, and the selecting step comprises selecting a mode from a group consisting of the plurality of first modes and the at least one second mode and a network connection selected from a group consisting of the one or more first connections and the one or more second connections to obtain the configuration to have the network connection with an optimum cost and the optimum signal level.

18. The method of claim 12, wherein
the priority comprises optimization of security, and the selecting step comprises selecting a mode from a group consisting of the plurality of first modes and the at least one second mode and a network connection selected from a group consisting of the one or more first connections and the one or more second connections to obtain the configuration to have the network connection with an optimum security level and the optimum signal level.

19. The method of claim 12, wherein
the priority comprises a context-oriented preference, and the selecting step comprises selecting a mode from a group consisting of the plurality of first modes and the at least one second mode and a network connection selected from a group consisting of the one or more first connections and the one or more second connections to obtain the configuration to have the network connection meeting the context-oriented preference with the optimum signal level.

20. The method of claim 12, further comprising a step of:
managing priorities based on at least part of a group consisting of information on network properties including costs and security levels, user's inputs and preferences, applications settings and rules, and conditions.

21. The method of claim 12, wherein
the second antenna is configured to be a second modal antenna having a plurality of second modes corresponding to a plurality of second radiation patterns.

22. The method of claim 12, further comprising a step of:
repeating the identifying step when signal deterioration occurs.

23. The method of claim 12, further comprising a step of:
repeating the selecting step when signal deterioration occurs.

24. The method of claim 12, wherein
the identifying step comprises first testing by sampling one or more channel quality metrics to assess availability, wherein the channel quality metrics comprise data rate, signal-to-noise ratio, received signal strength indicator, signal-to-interference-plus-noise ratio and throughput.

25. The method of claim 12, wherein
the selecting step comprises second testing by sampling one or more channel quality metrics to assess the signal level, wherein the channel quality metrics comprise data rate, signal-to-noise ratio, received signal strength indicator, signal-to-interference-plus-noise ratio and throughput.

26. The method of claim 24, wherein
the first testing comprises using a threshold for a channel quality metric and acknowledging the availability of the one or more first connections and the one or more second connections if the sampled channel quality metric surpasses the threshold.

27. The method of claim 24, wherein
the first testing is repeated with a first predetermined interval.

28. The method of claim 25, wherein
the second testing is repeated with a second predetermined interval.

29. The method of claim 25, wherein
the second testing is initiated when the sampled channel quality metric deteriorates to a first threshold, and the selecting step is initiated when the sampled channel quality metric further deteriorates to a second threshold.

30. A communication system adapted to operate with a plurality of network connections sequentially, comprising;
an antenna configured to transmit and receive signals in wireless local area network (WLAN) and wireless wide area network (WWAN), the antenna comprising a modal antenna,
the modal antenna comprising:
an antenna radiating element positioned above a ground plane forming an antenna volume therebetween,
a first parasitic element positioned outside the antenna volume and adjacent to the radiating element, the first parasitic element being coupled to a first active element and the first active element being further coupled to the ground plane, wherein the first active element is adapted to vary a coupling between the first parasitic element and the ground plane, and
a second parasitic element positioned within the antenna volume, the second parasitic element being coupled to a second active element and the second active element being further coupled to the ground plane, wherein the second active element is adapted to vary a coupling between the second parasitic element and the ground plane;
the modal antenna being configured to produce a plurality of first modes, each of the first modes corresponding to one of a plurality of first radiation patterns, respectively, for the WLAN, and further configured to produce a plurality of second modes, each of the second modes corresponding to one of a plurality of second radiation patterns, respectively, for the WWAN; and
a processor coupled to the antenna, wherein
the processor is configured to identify one or more first connections with the WLAN associated with one or more access points, respectively, and one or more second connections with the WWAN associated with one or more base stations, respectively, which are available in an area where the communication system is located, and to obtain a configuration that satisfies a priority and provides an optimum signal level by selecting a mode and a network connection for the configuration for each time period.

31. The communication system of claim 30, wherein
the priority comprises communication with the WLAN, and the configuration comprises a combination of a mode selected from the plurality of first modes and a network connection selected from the one or more first connections to have the network connection to the WLAN with the optimum signal level.

32. The communication system of claim 30, wherein
the priority comprises an emergency, and the configuration comprises a combination of a mode selected from a group consisting of the plurality of first modes and the plurality of second modes and a network connection selected from a group consisting of the one or more first connections and the one or more second connections to have the network connection with the optimum signal level.

33. The communication system of claim 30, wherein the priority comprises communication with the WWAN, and the configuration comprises a combination of a mode selected from the plurality of second modes and a network connection selected from the one or more second connection to have the network connection to the WWAN with the optimum signal level.

34. The communication system of claim 30, wherein the priority comprises optimization of cost, and the configuration comprises a combination of a mode selected from a group consisting of the plurality of first modes and the plurality of second modes and a network connection selected from a group consisting of the one or more first connections and the one or more second connections to have the network connection with an optimum cost and the optimum signal level.

35. The communication system of claim 30, wherein the priority comprises optimization of security, and the configuration comprises a combination of a mode selected from a group consisting of the plurality of first modes and the plurality of second modes and a network connection selected from a group consisting of the one or more first connections and the one or more second connections to have the network connection with an optimum security level and the optimum signal level.

36. The communication system of claim 30, wherein the priority comprises a context-oriented preference, and the configuration comprises a combination of a mode selected from a group consisting of the plurality of first modes and the plurality of second modes and a network connection selected from a group consisting of the one or more first connections and the one or more second connections to have the network connection meeting the context-oriented preference with the optimum signal level.

37. The communication system of claim 30, wherein the processor is further configured to perform a first test to identify the one or more first connections and the one or more second connections by sampling one or more channel quality metrics, wherein the channel quality metrics comprise data rate, signal-to-noise ratio, received signal strength indicator, signal-to-interference-plus-noise ratio and throughput.

38. The communication system of claim 30, wherein the processor is further configured to perform a second test to select the mode and the network connection by sampling one or more channel quality metrics to assess the signal level, wherein the channel quality metrics comprise data rate, signal-to-noise ratio, received signal strength indicator, signal-to-interference-plus-noise ratio and throughput.

39. The communication system of claim 30, wherein the processor is further configured to manage priorities based on at least part of a group consisting of information on network properties including security levels and costs, user's inputs and preferences, applications settings and rules, and conditions.

40. A method of wireless communication using a plurality of network connections sequentially, comprising:
providing an antenna for transmitting and receiving signals in wireless local area network (WLAN) and wireless wide area network (WWAN), the antenna comprising a modal antenna,
the modal antenna comprising:
an antenna radiating element positioned above a ground plane forming an antenna volume therebetween,
a first parasitic element positioned outside the antenna volume and adjacent to the radiating element, the first parasitic element being coupled to a first active element and the first active element being further coupled to the ground plane, wherein the first active element is adapted to vary a coupling between the first parasitic element and the ground plane, and
a second parasitic element positioned within the antenna volume, the second parasitic element being coupled to a second active element and the second active element being further coupled to the ground plane, wherein the second active element is adapted to vary a coupling between the second parasitic element and the ground plane;
said modal antenna being configurable about a plurality of first modes, each of the first modes corresponding to one of a plurality of first radiation patterns, respectively, for the WLAN, and said modal antenna being further configurable about a plurality of second modes, each of the second modes corresponding to one of a plurality of second radiation patterns, respectively, for the WWAN;
identifying one or more first connections with the WLAN associated with one or more access points, respectively, and one or more second connections with the WWAN associated with one or more base stations, respectively, which are available in an area where the wireless communication is conducted; and
selecting a mode and a network connection to obtain a configuration for the wireless communication to satisfy a priority and optimize a signal level during each time period.

41. The method of claim 40, wherein
the priority comprises communication with the WLAN, and the selecting step comprises selecting a mode from the plurality of first modes and a network connection from the one or more first connections to have the network connection to the WLAN with the optimum signal level.

42. The method of claim 40, wherein
the priority comprises an emergency, and the selecting step comprises selecting a mode from a group consisting of the plurality of first modes and the plurality of second modes and a network connection from a group consisting of the one or more first connections and the one or more second connections to have the network connection with the optimum signal level.

43. The method of claim 40, wherein
the priority comprises communication with the WWAN, and the selecting step comprises selecting a mode from plurality of second modes and a network connection from the one or more second connections to have the network connection to the WWAN with the optimum signal level.

44. The method of claim 43, further comprising steps of:
performing a vertical handoff to the WLAN; and
second selecting a mode from the plurality of first modes and a network connection from the one or more first connections,
wherein
a base station controller commands to move out of the network connection selected in the selecting step.

45. The method of claim 40, wherein
the priority comprises optimization of cost, and the selecting step comprises selecting a mode from a group consisting of the plurality of first modes and the plurality of second modes and a network connection selected from a group consisting of the one or more first connections and the one or more second connections to have the network connection with an optimum cost and the optimum signal level.

46. The method of claim 40, wherein
the priority comprises optimization of security, and the selecting step comprises selecting a mode from a group consisting of the plurality of first modes and the plurality of second modes and a network connection selected from a group consisting of the one or more first connections and the one or more second connections to have the network connection with an optimum security level and the optimum signal level.

47. The method of claim 40, wherein
the priority comprises a context-oriented preference, and the selecting step comprises selecting a mode from a group consisting of the plurality of first modes and the plurality of second modes and a network connection selected from a group consisting of the one or more first connections and the one or more second connections to have the network connection meeting the context-oriented preference with the optimum signal level.

48. The method of claim 40, further comprising a step of:
managing priorities based on at least part of a group consisting of information on network properties including costs and security levels, user's inputs and preferences, applications settings and rules, and conditions.

49. The method of claim 40, further comprising a step of:
repeating the identifying step when signal deterioration occurs.

50. The method of claim 40, further comprising a step of:
repeating the selecting step when signal deterioration occurs.

51. The method of claim 40, wherein
the identifying step comprises first testing by sampling one or more channel quality metrics to assess availability, wherein the channel quality metrics comprise data rate, signal-to-noise ratio, received signal strength indicator, signal-to-interference-plus-noise ratio and throughput.

52. The method of claim 40, wherein
the selecting step comprises second testing by sampling one or more channel quality metrics to assess the signal level, wherein the channel quality metrics comprise data rate, signal-to-noise ratio, received signal strength indicator, signal-to-interference-plus-noise ratio and throughput.

* * * * *